US 12,027,915 B2
United States Patent
Schenk et al.

(10) Patent No.: US 12,027,915 B2
(45) Date of Patent: Jul. 2, 2024

(54) COMPOSITE ROTOR

(71) Applicant: Rolls-Royce Corporation, Indianapolis, IN (US)

(72) Inventors: Peter Schenk, Indianapolis, IN (US); Mathew Hill, Indianapolis, IN (US); David Loder, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 263 days.

(21) Appl. No.: 17/444,734

(22) Filed: Aug. 9, 2021

(65) Prior Publication Data

US 2023/0039344 A1 Feb. 9, 2023

(51) Int. Cl.
*H02K 1/02* (2006.01)
*H02K 1/04* (2006.01)
*H02K 1/278* (2022.01)
*H02K 1/30* (2006.01)
*H02K 15/03* (2006.01)

(52) U.S. Cl.
CPC ............... *H02K 1/04* (2013.01); *H02K 1/02* (2013.01); *H02K 1/278* (2013.01); *H02K 1/30* (2013.01); *H02K 15/03* (2013.01)

(58) Field of Classification Search
CPC ........ H02K 1/04; H02K 1/278; H02K 1/2781; H02K 1/2783; H02K 1/28; H02K 1/30
USPC ........................................ 310/156.23, 156.31
See application file for complete search history.

(56) References Cited

U.S. PATENT DOCUMENTS

| | | | | |
|---|---|---|---|---|
| 4,868,970 | A | * | 9/1989 | Schultz ................... H02K 3/04 310/156.31 |
| 7,667,357 | B2 | | 2/2010 | Okada et al. |
| 8,987,955 | B2 | * | 3/2015 | Mizukami .............. H02K 11/40 310/43 |
| 2010/0277024 | A1 | * | 11/2010 | Rodriguez Rodriguez ............ H02K 1/2773 310/156.12 |
| 2015/0171718 | A1 | * | 6/2015 | Rasmussen .......... H02K 1/2791 156/305 |
| 2016/0248307 | A1 | * | 8/2016 | Kubota .................. H02K 19/36 |
| 2017/0201153 | A1 | * | 7/2017 | Yamanaka ............... H02K 1/30 |
| 2019/0214875 | A1 | * | 7/2019 | Tsuruta ................... H02K 1/28 |

FOREIGN PATENT DOCUMENTS

| | | | |
|---|---|---|---|
| JP | 2008147404 A | * | 6/2008 |
| WO | WO-2017098907 A1 | * | 6/2017 ............... H02K 1/22 |

OTHER PUBLICATIONS

Mochida, Machine Translation of JP2008147404, Jun. 2008 (Year: 2008).*
Ishikawa, Machine Translation of WO2017098907, Jun. 2017 (Year: 2017).*

(Continued)

*Primary Examiner* — Eric Johnson
(74) *Attorney, Agent, or Firm* — Shumaker & Sieffert, P.A.

(57) ABSTRACT

A rotor assembly includes a rotor core having an axial length and configured to rotate about a longitudinal axis and at least one permanent magnet disposed about a radially outer surface of the rotor core. The rotor assembly further includes an electrical insulator disposed between the radially outer surface of the rotor core and the at least one permanent magnet and configured to disrupt an electrical conduction path along the axial length of the rotor core.

18 Claims, 7 Drawing Sheets

(56) References Cited

OTHER PUBLICATIONS

Aegis, "Bearing Protection Handbook—Best Practices for Bearing Protection in New and Repaired Motors, Testing In-Service Motors, and Inspecting Damaged Motor Bearing," Edition 3, Electro Static Technology, www.est-aegis.com, (Applicant points out, in accordance with MPEP 609.04(a), that the year of publication, 2018, is sufficiently earlier than the effective U.S. filing date, so that the particular month of publication is not in issue.), 2018, 56 pp.

Talib et al., "Developing a hybrid, carbon/glass fiber-reinforced, epoxy composite automotive drive shaft", Jan. 2010, 9 pgs.

Pham et al., "A review on design, manufacture and mechanics of composite risers", Jan. 2016, 36 pgs.

Toh et al., "Material characterization of filament-wound cmoposite pipes", Aug. 2018, 26 pgs.

Driveshafts/Propshafts—Neapco Aftermarket, Retrieved from http://neapcoaftermarket.com/products/driveshafts-propshafts/ on Aug. 4, 2021, 7 pgs.

\* cited by examiner

COMPOSITE ROTOR

TECHNICAL FIELD

This disclosure relates to electric machines.

BACKGROUND

Electric machines convert between electrical energy and mechanical energy. As one example, an electric machine may operate as a generator that converts mechanical energy into electrical energy. As another example, an electric machine may operate as an electrical motor that converts electrical energy into mechanical energy. Electric machines typically include a rotor that rotates within a stator. Energy flows through the stator to or from the rotor. In an electric motor, the stator provides a rotating magnetic field that drives the rotor. In a generator, the stator converts a rotating magnetic field to electric energy.

SUMMARY

In one example, this disclosure describes a rotor assembly including a rotor core having an axial length and configured to rotate about a longitudinal axis; at least one permanent magnet disposed about a radially outer surface of the rotor core; and an electrical insulator disposed between the radially outer surface of the rotor core and the at least one permanent magnet and configured to disrupt an electrical conduction path along the axial length of the rotor core.

In another example, this disclosure describes an electrical insulator for a rotor assembly, the electrical insulator including a winding of a plurality of electrically insulating filaments, wherein the winding is in a cylindrical shape and is configured to mechanically couple to a rotor core, wherein the winding is configured to support at least one permanent magnet against a radially inwards pressure, and wherein the winding is configured to electrically insulate the at least one permanent magnet from the rotor core.

In another example, this disclosure describes a method of making a rotor assembly, the method including attaching an electrical insulator to one or more rotor core axial end segment; disposing a soft magnetic material adjacent to a radially inner surface of at least one permanent magnet; and securing the at least one permanent magnet to a radially outer surface of the electrical insulator via at least one band, wherein the electrical insulator is configured to reduce an electrical current flowing between the at least one permanent magnet and the rotor core.

The details of one or more examples are set forth in the accompanying drawings and the description below. Other features, objects, and advantages will be apparent from the description and drawings, and from the claims.

DETAILED DESCRIPTION

Figure 1:
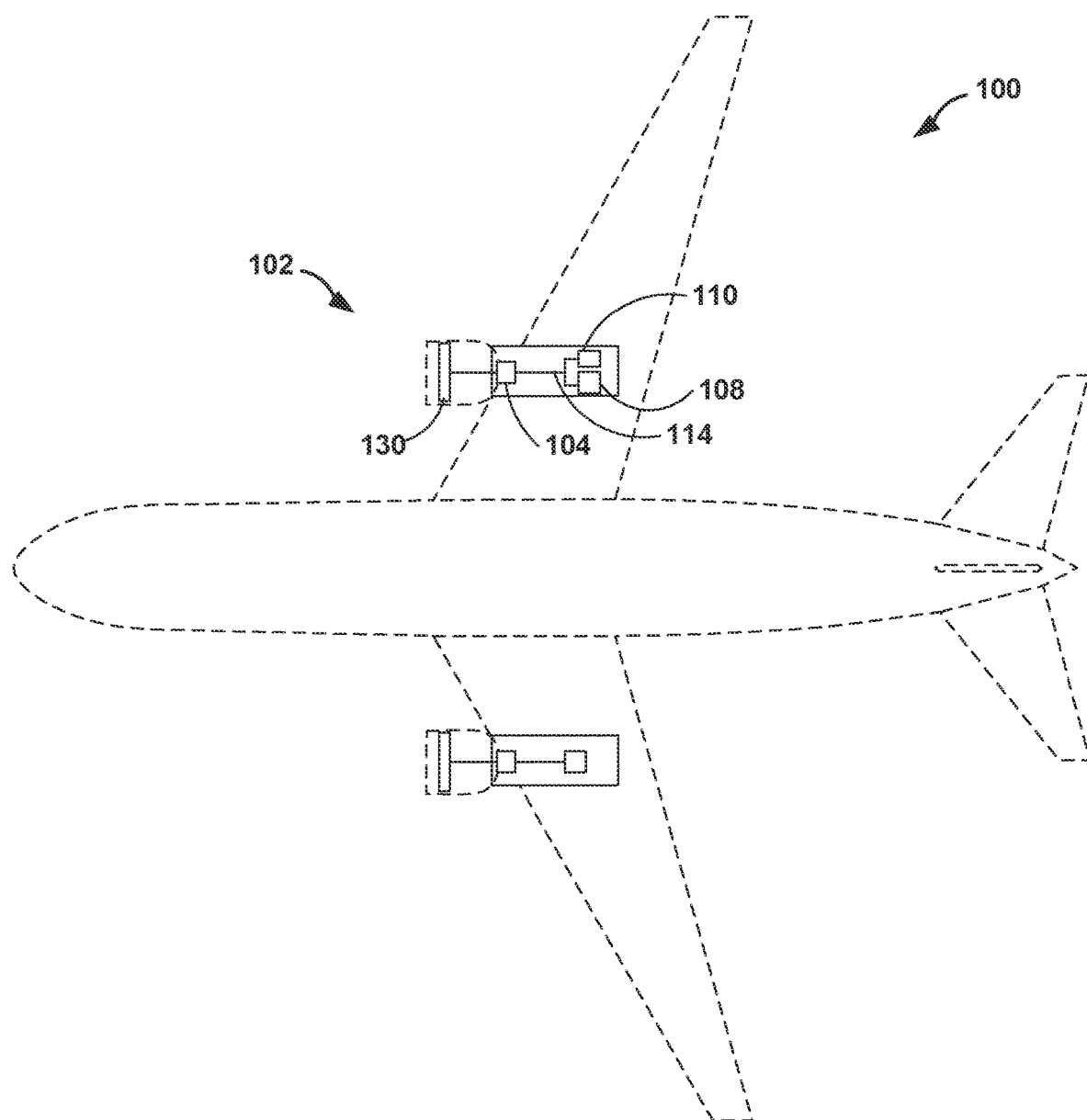
FIG. 1 is a conceptual diagram of a vehicle that includes an electric machine, in accordance with one or more techniques of this disclosure.

In the examples and techniques disclosed herein, this disclosure describes a rotor assembly including permanent magnets and an electrical insulator disposed between an outer surface of a rotor shaft and the magnetic components (i.e. permanent magnets and rotor core). The electrical insulator is configured to reduce and/or eliminate the flow of circulating bearing currents.

Electric machines may be used to provide energy to, or extract energy from, rotating devices. As one example, an electrical generator may convert rotational mechanical energy extracted from a combustion motor into electrical energy. As another example, an electrical motor may provide rotational mechanical energy to assist with starting a combustion motor. As another example, an electrical motor may provide rotational mechanical energy to drive a propulsor (e.g., fan, propeller, etc.) of a vehicle. An electric machine may operate in various modes at different times. For instance, a particular electric machine may operate as a starter to start a combustion motor at a first time and operate as a generator to convert rotational mechanical energy generated by the combustion motor into electrical energy at a second time. In this way, an electric machine may operate as an electrical starter-generator.

An electric machine may include a rotor that rotates relative to a stator. The rotor may include magnets, e.g., permanent magnets (PMs), disposed around a cylindrical body of the rotor. Magnetic fields of the magnets of the rotor interact with magnetic fields generated by windings included in the stator to transfer energy. The rotor may include banding, e.g., one or more bands and/or rings, configured to secure the magnets to the rotor against centrifugal forces, e.g., when the rotor is in operation and is rotating. Typically, the banding is metallic banding in order to satisfy strength, durability, and temperature requirements for reliably securing the magnets at high speeds (e.g., over 1,000 rotations per minute) for a relatively long period of time (e.g., over 1,000 hours of operation). The stator may transfer energy to, or receive energy from, the rotor via interaction between magnetic fields generated by the stator windings and magnetic fields generated by the rotor. For example, an alternating current may be applied to the stator windings in a motor which may cause alternating magnetic fields. Interaction between magnetic fields generated by the magnets of the rotor and the alternating magnetic fields may transfer and convert the electrical energy in the stator windings to mechanical motion (e.g., rotation) of the rotor. Similarly, rotation of the rotor in a generator may cause alternating magnetic fields which may transfer and convert the mechanical energy of the motion of the rotor to electrical energy in the stator windings via induction of a current in the windings by the alternating magnetic fields.

The alternating magnetic fields in an electric machine (e.g., motor or generator) may also induce eddy currents in conductors that are within the magnetic fields, such as the magnets and the metallic banding of the rotor. Such eddy currents are energy losses between the rotor and stator because at least some of the energy to be transferred between the rotor and the stator is coupled into the induced eddy currents, at least a portion of which is ultimately converted to heat via resistance in the material (e.g., the metallic banding and/or magnets). Additionally, eddy currents and/or other induced currents may manifest as electrical leakage currents and may flow in circuits through multiple rotor components in electrical contact with each other. For example, induced leakage currents may result in a shaft voltage greater than the breakdown voltage of the bearing lubricant, causing electrical discharge between the metallic shaft in contact with ball bearings, and the bearings raceway (or "race"). Such electrical discharge currents may cause "fluting" in the bearing race, e.g., ablation of material of the race due to electrical discharge between ball bearings and the race resulting in a "washboard" type fluting, and "hazing" of the bearings. Fluting and hazing increase friction of the ball bearings and reduction in performance of the motor.

Conventional generators and electric motors typically employ an all-metallic rotor core construction for simplified manufacturing and cost, but may be sub-optimized in terms of leakage current. For reducing or eliminating circulating bearing currents, solutions may include the use of ceramic ball bearings or insulated bearing races; however, it is often desirable to have exceptionally smooth and hard bearing surfaces and surfaces on which the bearings can roll in the bearing race, e.g., such as machined metallic surfaces precluding ceramic ball bearings or insulated bearing races.

Rotor backing material, e.g., a rotor back iron, may be designed to optimize tradeoffs between electrical conductivity, magnetic permeability, and saturation flux density, along with mechanical properties. Magnetic materials with "better" magnetic properties, e.g., higher permeability and saturation flux density, generally come at the expense of higher electrical conductivity and increased rotor core loss, e.g., via coupling of energy into eddy currents, circulating bearing currents, or other electrical/mechanical losses. A rotor assembly utilizing of a Halbach array of permanent magnets may reduce and/or ease the magnetic performance requirements of the rotor backing material because the magnet array assists in directing the magnetic flux. The rotor backing material may then need only have a relative magnetic permeability on the order of 100 or lower, in contrast to 1,000 to 10,000 as may typically be required. The rotor backing material may also then need a saturation flux density of less than 0.5 Tesla, in contrast to 2.0 Tesla or higher as may typically be required. Therefore the backing material may be optimized for reducing the electrical conductivity and associated core loss.

In accordance with one or more techniques of this disclosure, a rotor assembly includes at least one permanent magnet and an electrical insulator disposed between an outer surface of a rotor core and the at least one permanent magnet. The electrical insulator is configured to reduce and/or eliminate the flow of electrical current axially through the rotor assembly, e.g., reducing and/or eliminating circulating bearing currents. In other words, the rotor core may be a composite assembly of metallic and electrically insulating components.

FIG. 1 is a conceptual diagram of a vehicle 100 that includes an electric machine, in accordance with one or more techniques of this disclosure. In some examples, vehicle 100 is an aircraft. In other examples, vehicle 100 may include any type of vehicle utilizing an electric machine, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. Vehicle 100 may be manned, semiautonomous, or autonomous.

As shown in the example of FIG. 1, vehicle 100 may include propulsion system 102. In some examples, propulsion system 102 may include a combustion engine, such as a gas-turbine engine. Propulsion system 102 includes motor 104 that is configured to drive propulsor 130. Propulsion systems that include gas-turbine engines may include electric generator 108 that may both start the gas-turbine engines and generate electrical power using mechanical energy generated by the gas-turbine engines. As shown in FIG. 1, propulsion system 102 may include generator 108 and energy storage system (ESS) 110 coupled to electrical bus 114, and motor 104 coupled to electrical bus 114.

In accordance with one or more techniques of this disclosure, motor 104 and/or generator 108 may include a permanent magnet rotor assembly. In some examples, the permanent magnet rotor assembly may include at least one permanent magnet disposed about a radially outer surface of a rotor core having an axial length and configured to rotate about a longitudinal axis. The permanent magnet rotor assembly may further include an electrical insulator disposed between the radially outer surface of the rotor core and the permanent magnets, and the electrical insulator may disrupt an axial electrical conduction path along the axial length of the rotor core, thereby reducing and/or eliminating the flow of circulating bearing currents.

Figure 2:
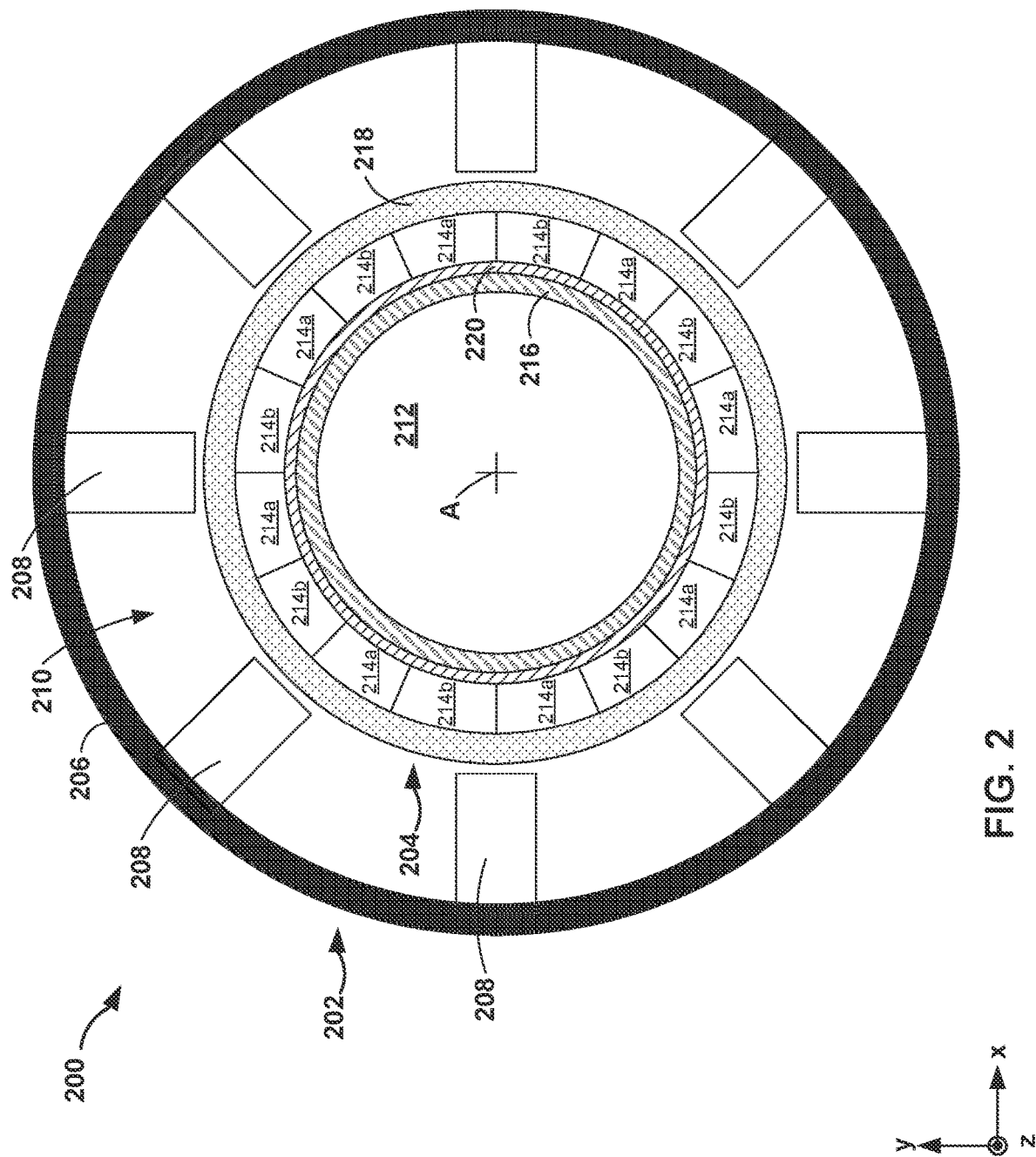
FIG. 2 is a cross-sectional view of an electric machine, in accordance with one or more techniques of this disclosure.

FIG. 2 is a cross-sectional view of an electric machine 200 as viewed along axis A, in accordance with one or more techniques of this disclosure. In the example shown, electric machine 200 includes stator 202 and rotor assembly 204. In some examples, electric machine 200 may be either, or both, of an electric generator configured to convert mechanical energy to electrical energy or an electric motor configured to convert electrical energy to mechanical energy.

In the example shown, stator 202 includes base portion 206 and a plurality of stator teeth 208. Stator teeth 208 may project radially inward towards longitudinal axis A of rotor assembly 204 from base portion 206. In some examples, the plurality of stator teeth 208 may be disposed circumferentially around longitudinal axis A, e.g., about the z-axis as illustrated. In some examples, stator 202 may have a length that is substantially the entire length of electric machine 200 and/or rotor assembly 204, e.g., along longitudinal axis A in the z-direction. In other examples, electric machine 200 may include a plurality of stators 202 disposed along a longitudinal axis A in the z-direction, each stator 202 having a length that is substantially less than the length of electric machine 200 and/or rotor assembly 204. In some examples, stator teeth 208 may define a plurality of slots 210 between stator teeth 208. A plurality of stator windings (not shown) may be wound around the plurality of stator teeth 208 and at least partially filling stator slots 210.

In the example shown, rotor assembly 204 includes rotor core 212, electrical insulator 216, a plurality of magnet pairs 214a and 214b of opposite polarity (collectively referred to as magnets 214) disposed on or about the surface of rotor core 212, and metallic banding 218. As used herein, magnets of the "same polarity" have their magnetic poles oriented in the same direction, and magnets of the "opposite polarity" have their magnetic poles oriented in opposite directions. Namely, magnets do not have a particular polarity, but rather an orientation of their magnetic poles. For ease of description, magnets described as having the "same polarity" or "opposite polarity" relative to each other as used herein means that the magnets are oriented with like poles (e.g., their magnetic north and south poles) oriented in the same direction or opposite direction, respectively, relative to each other. For example, the magnetic north and south poles of magnets 214a and 214b may be oriented opposite to each other such that the north magnetic pole of magnet 214a may be at the end of magnet 214a in the positive z-direction and its south magnetic pole may be at its end in the negative z-direction, and the opposite may be true for magnet 214b.

Metallic banding 218 may be configured to secure magnets 214 to the outer surface of rotor core 212. In some examples rotor core 212 may be a hollow shell and/or drum. In some examples, rotor core 212 may be and/or include a drive shaft, or rotor core 212 may be mechanically coupled to a drive shaft in other examples.

When electric machine 200 is operating as a generator, a torque may be applied to rotor assembly 204, e.g., via rotor core 212 as a drive shaft. The rotation of rotor assembly 204 may cause an alternating magnetic field at each of stator teeth 208 due to the rotation of the magnet pairs 214a and 214b. The alternating magnetic fields may induce a current, e.g., and alternating current (AC) to flow in the windings of stator 202, thereby converting the mechanical energy (rotation) of the rotor into electrical energy in the windings. When electric machine 200 is operating as a motor, the opposite conversion may occur. Namely, AC flowing through the windings of stator 202 may cause alternating magnetic fields, which interact with magnets 214 to induce a torque on rotor assembly 204 thereby converting the electrical energy in the windings to mechanical energy of the rotor assembly.

In some examples, the alternating magnetic fields may induce eddy currents in conductors located within the fields, e.g., magnets 214, metallic banding 218, etc. To reduce eddy currents, magnets 214 (e.g., each of the magnets 214a and 214b about the circumference of rotor core 212) and metallic banding 218 may be segmented in the axial direction into a plurality of segmented magnets 214 and a plurality of segmented metallic bands 218, e.g., along longitudinal axis A in the z-direction (not visible in the cross-section of FIG. 2 but illustrated in FIGS. 3-6).

Figure 4:
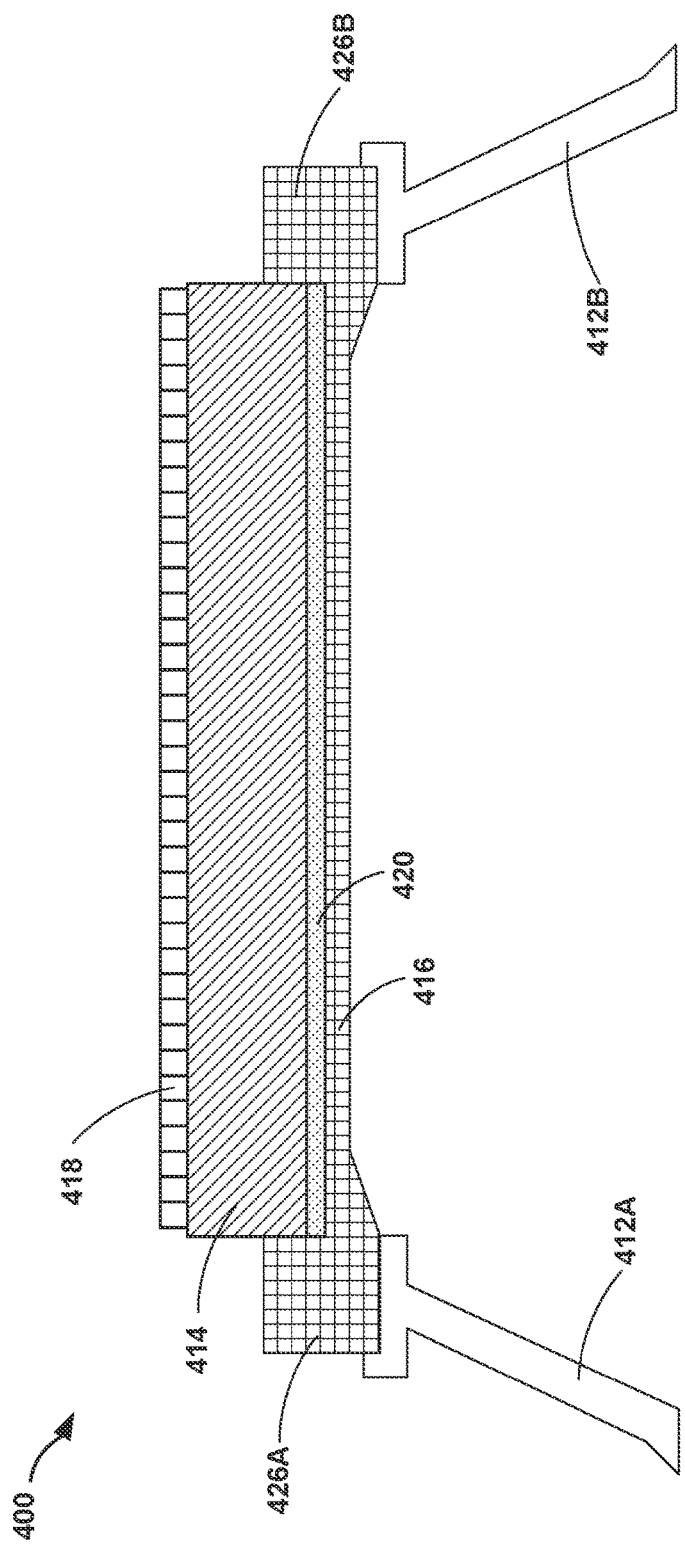
FIG. 4 is a cross-sectional view of a portion of an example rotor assembly, in accordance with one or more techniques of this disclosure.
Figure 5:
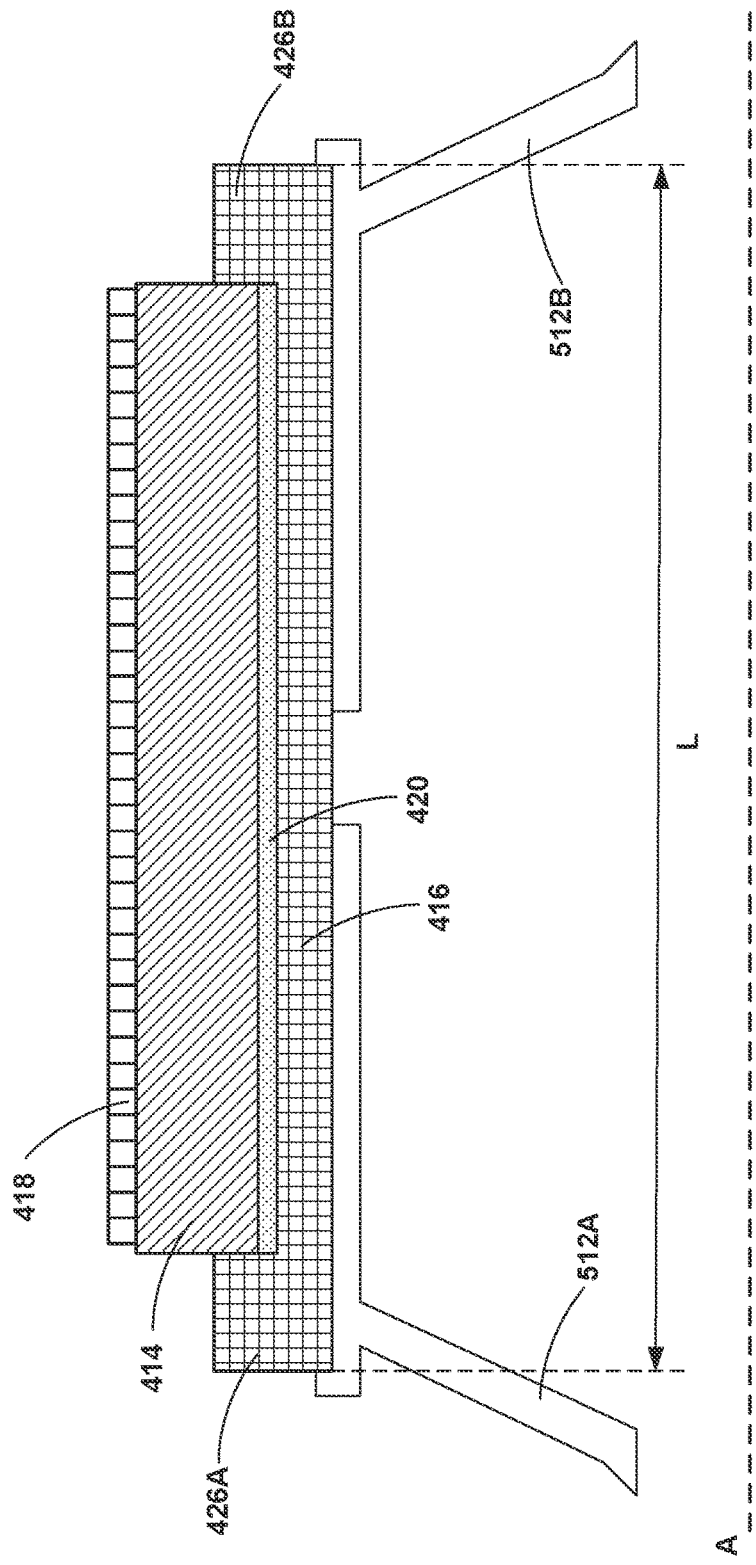
FIG. 5 is a cross-sectional view of a portion of another example rotor assembly, in accordance with one or more techniques of this disclosure.
Figure 6:
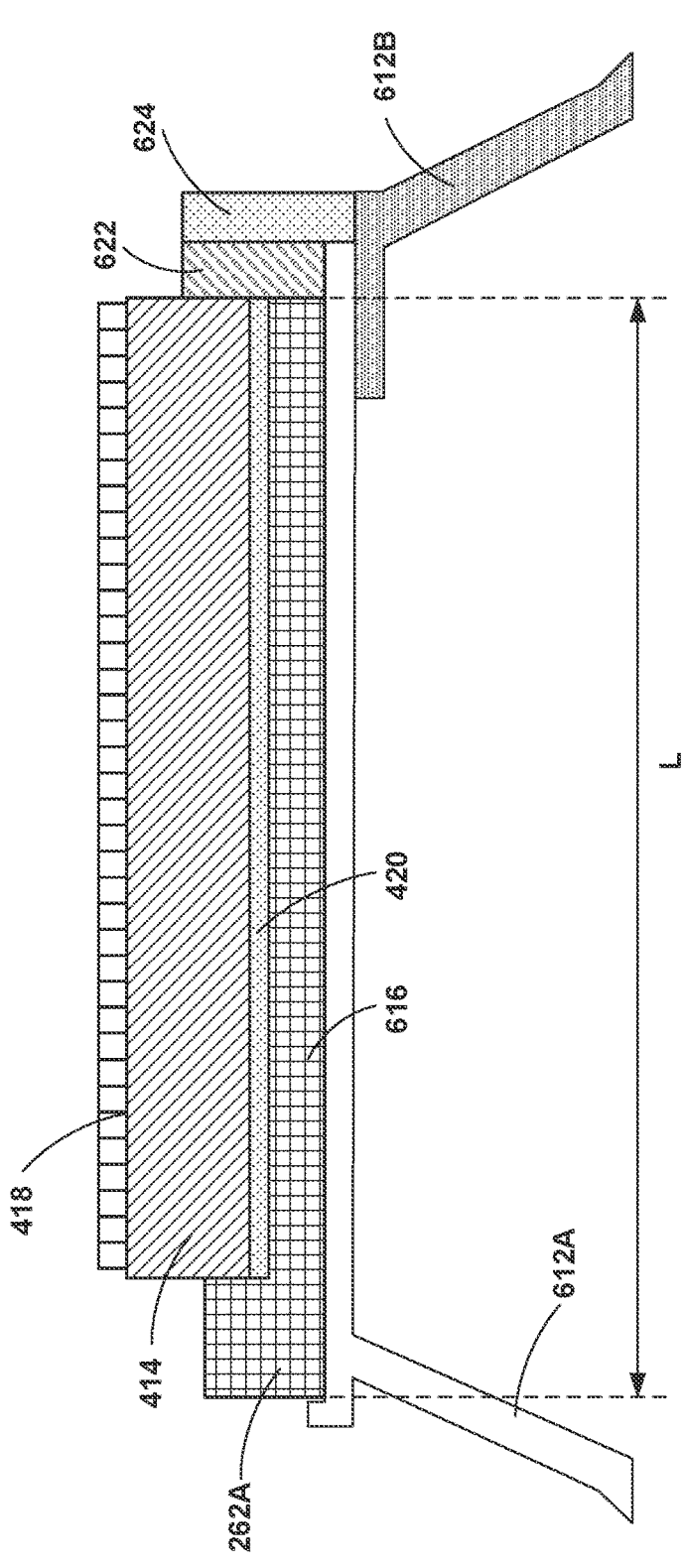
FIG. 6 is a cross-sectional view of a portion of another example rotor assembly, in accordance with one or more techniques of this disclosure.

In accordance with one or more techniques of this disclosure, rotor assembly 204 may include electrical insulator 216 configured to electrically insulate and/or isolate rotor core 212 and permanent magnets 214 and thereby interrupt, reduce, and/or eliminate electrical currents flowing between rotor core 212 and permanent magnets 214, such as circulating bearing currents. In some examples, rotor core 212 may not extend along the entire longitudinal length of rotor assembly 204 and electrical insulator 216 may further provide structural and/or mechanical support to permanent magnets 214. For example, rotor core 212 may include a support arms at each end of rotor assembly 204, the support arms and/or axial end segments, each axial end segment extending radially from an axial shaft and mechanically engaging with and/or connecting to electrical insulator 216. Insulator 216 may extend for at least a portion of the longitudinal distance between the support arms forming a hollow shell or drum to which permanent magnets 214 may be attached, as best seen in FIGS. 4-6 below. As such, electrical insulator 216 may support permanent magnets 214 at a radial position against a radially inwards pressure. In some examples, permanent magnets 214 may be a Halbach array of permanent magnets.

In some examples, rotor assembly 204 may include soft magnetic material 220 disposed adjacent to a radially inwards surface of permanent magnets 214. In some examples, soft magnetic material 220 may be a coating, a layer, a plurality of individual soft magnets, and the like. In some examples, soft magnetic material 220 may be a sleeve disposed between the at least one permanent magnet and the electrical insulator. In some examples, soft magnetic material may be nickel-zinc (NiZn) ferrite, molypermalloy (MPP) dispersed within a non-magnetic and electrically insulating binder or resin material, or iron powder dispersed within a non-magnetic and electrically insulating binder or resin material, or any combination thereof. In some examples, soft magnetic material 220 may be integrated with electrical insulator 216, e.g., the material and/or functionality of soft magnetic material 220 described herein may be included in electrical insulator 216 and rotor assembly 204 may not include a separate soft magnetic material 220 "layer" as shown in FIG. 2. In some examples, soft magnetic material 220, or electrical insulator 216, may have a relative magnetic permeability of equal to or less than 100 and a saturation flux density of equal to or less than 0.5 Tesla.

Figure 3:
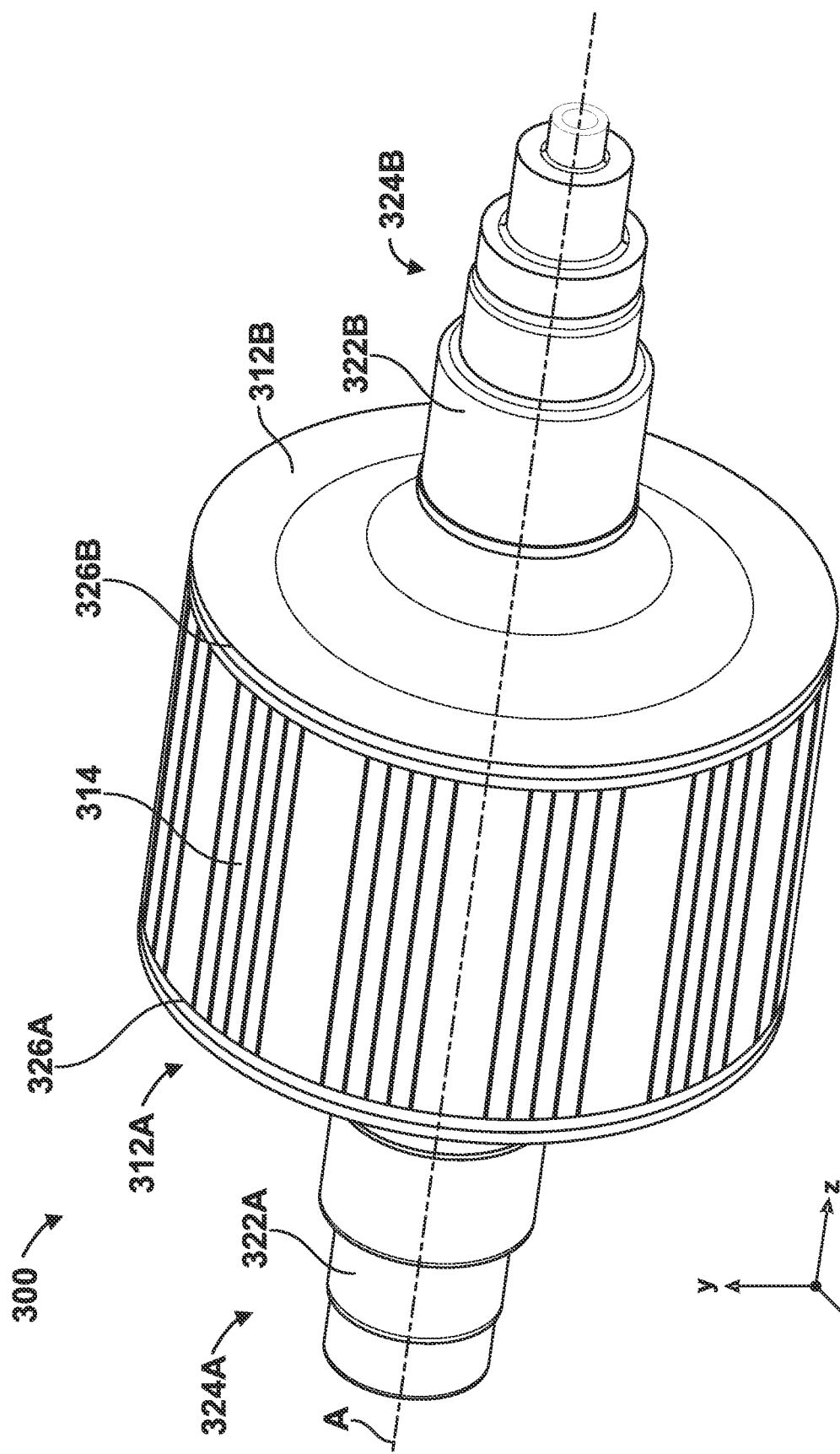
FIG. 3 is a perspective view of a rotor assembly, in accordance with one or more techniques of this disclosure.

FIG. 3 is a perspective view of a rotor assembly 300, in accordance with one or more techniques of this disclosure. In the example shown, rotor assembly 300 includes rotor shaft 322, rotor core 312, permanent magnets 314. Rotor assembly 300 also includes an electrical insulator and a soft magnetic material, both of which are disposed beneath (e.g., radially inwards towards axis A) permanent magnets 314 and are not visible in FIG. 3.

Rotor shaft 322 is configured to support rotor core 312 and contact one or more bearings to rotate about longitudinal axis A. Rotor shaft 312 is made of a hard material, e.g., a metal, and has a smooth surface finish at least in the areas that contact one or more bearings so as to minimize friction and/or resistance to rotation.

Rotor core 312 is configured to support permanent magnets 314 at a radial distance from axis A, e.g., so as to efficiently interact with a stator via alternating magnetic fields (either as a generator or motor). Rotor core 312 may be attached to, or may integrally include an electrical insulator and soft magnetic material (e.g., a soft magnetic material positioned to be adjacent to permanent magnets 314).

In the example shown, rotor core 312 is integral with rotor shaft 322 and includes a first axial end segment 324A and second axial end segment 324B, collectively referred to as axial end segments 324. Axial end segments 324 are configured to attach to and support an electrical insulator disposed between axial end segments 324. The insulator may be configured to support permanent magnets 314 at a radial position and electrically insulate and/or isolate permanent magnets 314 from axial end segments 324.

In some examples, the insulator may be configured to axially retain permanent magnets 314. For example, permanents magnets may not extend the full axial length between axial end segments 324, e.g., for ease of assembly of rotor assembly 300. Axial spacers 326A and 326B may be placed about axial end segments 324 during assembly of rotor assembly 300 and may be configured to axially retain permanent magnets 314 during operation of rotor assembly 300. The insulator may extend radially at one or both ends to form spacers 326A and/or 326B, as best seen in FIGS. 4-6, and may both axially retain permanent magnets 314 and electrically insulate and/or isolate permanent magnets 314 from axial end segments 324.

FIG. 4 is a cross-sectional view of a portion of an example rotor assembly 400, in accordance with one or more techniques of this disclosure. In the example shown, rotor assembly 400 includes axial end segments 412A and 412B (collectively "axial end segments 412"), electrical insulator 416, soft magnetic material 420, permanent magnets 414, and metallic banding 418.

Axial end segments 412 may be configured to attach to and support electrical insulator 416, e.g., to rotate about longitudinal axis A. Axial end segments 412 may be made of a metal or metal alloy. Axial end segments 412 and electrical insulator 416 together may form a rotor core of rotor assembly 400.

Permanent magnets 414 may be a plurality of magnet pairs of opposite polarity disposed on or about electrical insulator 416, and may be substantially similar to permanent magnets 214 described above. In some examples, permanent magnets 414 may be a Halbach array of permanent magnets.

Electrical insulator 416 extends between axial end segments 412 and is configured to support permanent magnets 414 in the radial direction (e.g., the y-direction as shown) and/or the longitudinal direction (e.g., the z-direction as shown). For example, metallic banding 418 is configured to retain permanent magnets 414 to electrical insulator 416 may apply a radially inwards force and/or pressure to permanent magnets 414, e.g., so as to resist centrifugal forces during operation and to otherwise retain permanent magnets 414 to electrical insulator 416. Electrical insulator 416 may be stiff enough to resist the inwards radial force and/or pressure applied by metallic banding 418 to retain permanent magnets 414 at a radial position, e.g., from longitudinal axis A. Electrical insulator 416 may further comprise ends 426A and 426B configured to retain permanent magnets 414 in the direction of the longitudinal axis, e.g., to function as spacers between permanent magnets 414 and axial end segments 412. Electrical insulator 416 is configured to electrically insulate and/or isolate permanent magnets 414 from axial end segments 412. In other words, electrical insulator 416 is configured to reduce and/or eliminate electrical currents from flowing between permanent magnets 414 and axial end segments 412.

In some examples, electrical insulator 416 may comprise a glass fiber material or a composite glass fiber material. For example, electrical insulator 416 may be comprised of a composite S-glass material that is filament wound about a mandrel in a desired shape. In some examples, the desired shape may be a cylindrical sleeve or shell. In other examples, electrical insulator 416 may be made of an electrically insulating filament, a winding of a plurality of filaments, or other electrically insulating materials. Generally, electrical insulator 416 may be made of an electrically insulating material with suitable strength parameters to at least partially support permanent magnets 414, e.g., yield strength, tensile strength, fatigue strength, crack resistance, modulus, and the like.

Electrical insulator 416 may also be configured with strength parameters sufficient to transfer torque between axial end segments 412. In some examples, electrical insulator 416 is configured with strength parameters sufficient to accommodate and/or support radial loads, such as those due to residual unbalance and the like. Electrical insulator 416 may be mechanically connected and/or attached to axial end segments 412 via any suitable means or method. In some examples, electrical insulator 416 may be mechanically connected to axial end segments 412 via a trap-lock fitting. In some examples, electrical insulator 416 may be mechanically connected to axial end segments 412 via one or more of an adhesive, a mechanical fastener, a compression fitting, a push-lock fitting, a weld such as a friction weld and/or a laser beam weld, a frictional and/or press fit, or a trap-lock fitting, alone or in any combination.

In the example shown, soft magnetic material 420 is disposed adjacent to permanent magnets 414 and between permanent magnets 414 and electrical insulator 416. Soft magnetic material 420 may be configured to return magnetic flux to the stator of an electrical machine including rotor assembly 400. In some examples, soft magnetic material 420 may be a ferrous material. For example, soft magnetic material 420 may be a solid ferrous material sleeve, e.g., SAE-9310 or the like, placed between permanent magnets 414 and electrical insulator 416, e.g., during assembly of rotor assembly 400. In some examples, soft magnetic material 420 may be configured to retain its radial shape and/or otherwise resist an applied force and/or pressure of metallic banding 418 retaining permanent magnets 414 to electrical insulator 416. In other words, soft magnetic material 420 in the form of a separate sleeve may include mechanical properties which may ease the mechanical requirements of electrical insulator 416, and electrical insulator 416 may be configured to electrically insulate and/or isolate permanent magnets 414 from axial end segments 412, transfer torque between axial end segments 412, and radially and axially locate permanent magnets 414.

In some examples, it may be undesirable to have a soft magnetic material 420 that is highly magnetic and highly electrically conductive, e.g., such as a conventional ferromagnetic steel which may allow the formation of eddy currents within the material and causing a loss of power, the eddy currents being induced via non-synchronous magnetic flux from switching converters of the electric machine utilizing rotor assembly 400. In such examples, soft magnetic material 420 may be a material with a low permeability and a low conductivity, such as a nickel-zinc ferrite material or the like. In some examples, soft magnetic material 420 may have a relative permeability of less than or equal to 100 and a saturation flux density of less than or equal to 0.5 Tesla. In some examples, soft magnetic material 420 may have a relative permeability of about 7.5 and a saturation flux density of about 0.18 Tesla.

In some examples, soft magnetic material 420 may be integrated into and/or with electrical insulator 416. In some examples, soft magnetic material 420 may be a powder core integrated with electrical insulator 416. Powder cores may be used in high frequency magnetics, and may be formed by combining a powder of a magnetic material, such as iron powder or other magnetic alloys, with a non-magnetic, non-conductive binder and/or resin. In some examples, electrical insulator 416 may be a composite of an electrically insulating material and a powder core. For example, electrical insulator 416 may be a composite of glass fibers, a magnetic material powder (e.g., an iron powder), and an electrically non-conductive binder and/or resin. In some examples, composite electrical insulator 416/soft magnetic material 420 may comprise a molypermalloy powder (MPP) core, and may have a conductivity of about 0.00017% International Annealed Copper Standard (% IACS).

FIG. 5 is a cross-sectional view of a portion of another example rotor assembly 500, in accordance with one or more techniques of this disclosure. In the example shown, rotor assembly 500 includes axial end segments 512A and 512B (collectively "axial end segments 512"), electrical insulator 416, soft magnetic material 420, permanent magnets 414, and metallic banding 418. Electrical insulator 416, soft magnetic material 420, permanent magnets 414, and metallic banding 418 may be substantially similar to those described above. Axial end segments 512 and electrical insulator 416 together may form a rotor core of rotor assembly 500.

Axial end segments 512 may be configured to attach to and support electrical insulator 416, e.g., to rotate about longitudinal axis A, and may be substantially similar to axial end segments 412 described above, except that axial end segments 512 extend further in the axial direction thereby providing mechanical support to electrical insulator 416. In the example shown, axial end segments 512 may extend towards each other by at least 10% of the axial length L of insulator 416, or by at least 20% of the axial length L separating them, at least 50% of the axial length L separating them, at least 80% of the axial length L of insulator 416, at least 90% of the axial length L of insulator 416. In other words, a gap between axial end segments 512, e.g., the longitudinal distance over which electrical insulator 416 provides mechanical support for permanent magnets 414 without end segments 512 as a support material, may be less than or equal to 90% of the axial length L of insulator 416, or less than or equal to 80% of the axial length L of insulator 416, or less than or equal to 50% of the axial length L of insulator 416, or less than or equal to 20% of the axial length L of insulator 416, or less than or equal to 10% of the axial length L of insulator 416.

In the example shown, axial end segments 512A and 512B extend an equal amount towards each other in the longitudinal/axial direction. In other examples, axial end segment 512A may extend towards axial end segment 512B for a greater portion of the axial length L of insulator 416 than axial end segment 512B, or axial end segment 512B may extend towards axial end segment 512A for a greater portion of the axial length L of insulator 416 than axial end segment 512A.

FIG. 6 is a cross-sectional view of a portion of another example rotor assembly 600, in accordance with one or more techniques of this disclosure. In the example shown, rotor assembly 600 includes axial end segments 612A and 612B (collectively "axial end segments 612"), electrical insulator 616, soft magnetic material 420, permanent magnets 414, and metallic banding 418. Soft magnetic material 420, permanent magnets 414, and metallic banding 418 may be substantially similar to those described above.

Axial end segments 612 may be configured to attach to and support electrical insulator 416, e.g., to rotate about longitudinal axis A, and may be substantially similar to axial end segments 412 described above, except that axial end segments 612 extend the full axial length L of electrical insulator 416. Axial end segments 612 may be configured to mechanically connect and/or attach to each other, e.g., via at least one of an adhesive, a mechanical fastener, a compression fitting, a push-lock fitting, a frictional and/or press fit, a trap-lock fitting, or a weld such as a friction weld and/or a laser beam weld, alone or in any combination. Axial end segments 612 may be configured to transfer torque between each other, e.g., alone or in combination with electrical insulator 616.

Axial end segments 612, alone or in combination with electrical insulator 616, may form a rotor core of rotor assembly 400. In the example shown, axial end segment 614A extends axially towards axial end segment 614B for a greater portion of the axial length L of electrical insulator 616 than axial end segment 614B, and radially overlaps with axial end segment 614B. In other examples, axial end segment 614B may extend axially towards axial end segment 614A for a greater portion of the axial length L of electrical insulator 616 than axial end segment 614A and may radially overlap with axial end segment 614A. In other examples, axial end segments 614 may extend axially towards each other for equal portions of the axial length L of electrical insulator 616, and may or may not overlap. For example, axial end segments 614 may abut each other and may be mechanically connected, e.g., via a weld such as a friction weld and/or a laser beam weld, or any suitable mechanical connection. In some examples, axial end segments 612 may not be mechanically separate articles but rather axial end portions of a single rotor core.

Electrical insulator 616 may be substantially similar to electrical insulator 416 described above, except that electrical insulator 616 may not be required to transfer torque between axial end segments 612, and electrical insulator 616 may not be required to radially support permanent magnets 614.

In some examples, electrical insulator 616 may include end 626A and 626B (not shown) configured to retain permanent magnets 414 in the direction of the longitudinal axis, e.g., to function as spacers between permanent magnets 414 and axial end segments 612. In the example shown, electrical insulator 616 includes end 626A, and the opposite end of rotor assembly 600 includes spacer 622 and end retainer 624, which are configured to retain permanent magnets 414 in the direction of the longitudinal axis. Spacer 622 may comprise an electrically insulating material, e.g., similar to electrical insulator 616. In the example shown, end retainer 624 is a separate part from axial end segment 612B and is mechanically connected and/or attached to axial end segment 612B. In some examples, end retainer 624 may be integral with axial end segment 612B, e.g., included as a portion of axial end segment 612B.

Figure 7:
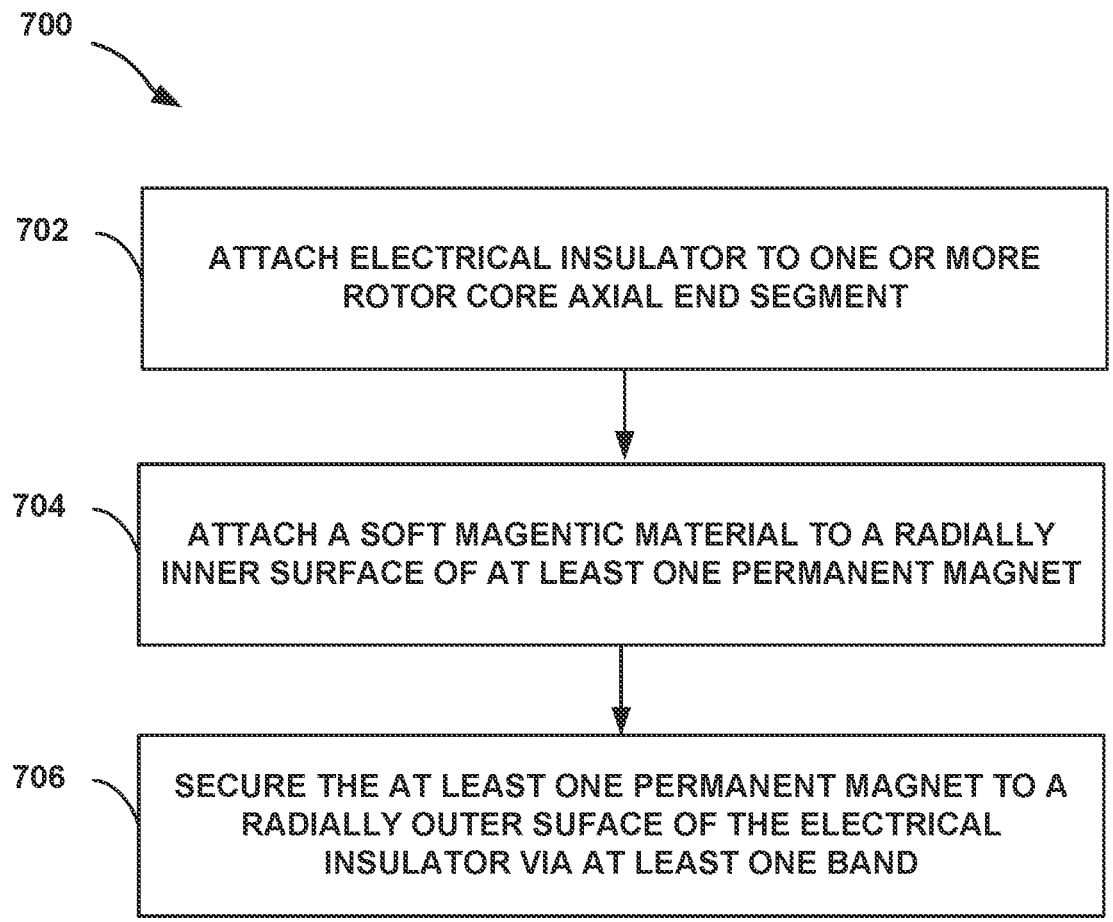
FIG. 7 is a flowchart of an example technique for making a rotor assembly, in accordance with one or more techniques of this disclosure.

FIG. 7 is a flowchart of an example technique 700 for making a rotor assembly, in accordance with one or more techniques of this disclosure. Although described with reference to rotor assemblies 300-600 of FIGS. 3-6, the technique may be used to form any suitable rotor assembly including an electrical insulator configured to reduce an electrical current flowing between a permanent magnet and the rotor core.

A rotor assembly fabricator, e.g., a person and/or rotor assembly machine, may attach an electrical insulator to one or more rotor core axial end segments (702). For example, the rotor assembly fabricator may attach electrical insulator 416, 616 to axial end segments 412, 512, 612 via one or more of an adhesive, a mechanical fastener, a compression fitting, a push-lock fitting, a weld such as a friction weld and/or a laser beam weld, a frictional and/or press fit, or a trap-lock fitting, alone or in any combination. Electrical insulator 416, 616 may be configured to resist an inwards radial force and/or pressure applied by metallic banding 418 to retain permanent magnets 414 at a radial position, and may further include ends 426A and/or 426B configured to retain permanent magnets 414 in the direction of the longitudinal axis, e.g., to function as spacers between permanent magnets 414 and axial end segments 412, 512, 612. Electrical insulator 416, 616 is configured to electrically insulate and/or isolate permanent magnets 414 from axial end segments 412, 512, 612. In other words, electrical insulator 416, 616 is configured to reduce and/or eliminate electrical currents from flowing between permanent magnets 414 and axial end segments 412, 512, 612, and may reduce and/or eliminate one or more circulating bearing currents. Electrical insulator 416, 616 may also be configured with strength parameters sufficient to transfer torque between axial end segments 412, 512, 612 and/or to accommodate and/or support radial loads, such as those due to residual unbalance and the like.

In some examples, electrical insulator 416, 616 may comprise a glass fiber material, a composite glass fiber material, an electrically insulating fiber or filament and/or filament winding. In some examples, electrical insulator 416, 616 may be comprised of a composite S-glass material that is filament wound about a mandrel in a desired shape, such as a cylindrical sleeve or shell. In some examples, electrical insulator 416, 616 may comprise a thermosetting polymer and/or a thermoplastic, e.g., not containing electrically conductive materials (such as carbon fiber, graphite, and the like).

A rotor assembly fabricator may dispose a soft magnetic material adjacent to a radially inner surface of at least one permanent magnet (704). For example, the rotor assembly fabricator may dispose soft magnetic material 420 in sleeve and/or shell form over electrical insulator 416, 616, e.g., on a radially outer surface of electrical insulator 416, 616, before attaching permanent magnets 414 to a radially outer surface of soft magnetic material 420 via banding 418. In some examples, the rotor assembly fabricator may dispose soft magnetic material 420 adjacent to permanent magnets 414 when permanent magnets 414 are attached to rotor assembly 400, 500, 600. For example, soft magnetic material 420 may be integrated with electrical insulator 416, 616, and may be disposed adjacent to permanent magnets 414 when the rotor assembly fabricator places the permanent magnets 414.

Soft magnetic material 420 may be configured to return magnetic flux to the stator of an electrical machine including rotor assembly 400. In some examples, soft magnetic material 420 may be a ferrous material, e.g., SAE-9310 or the like. In other examples, soft magnetic material 420 may be a material with a low permeability and a low conductivity, such as a nickel-zinc ferrite material or the like, and soft magnetic material 420 may have a relative permeability of less than or equal to 100 and a saturation flux density of less than or equal to 0.5 Tesla. In some examples, soft magnetic material 420 may have a relative permeability of about 7.5 and a saturation flux density of about 0.18 Tesla.

In some examples, soft magnetic material 420 may be integrated into and/or with electrical insulator 416, 616, e.g., as a combination of a powder of a magnetic material, such as iron powder or other magnetic alloys, with a non-magnetic, non-conductive binder and/or resin and composite of glass fibers. In some examples, electrical insulator 416, 616 may be a composite material including soft magnetic material 420 and may comprise a molypermalloy powder (MPP) core, and may have a conductivity of about 0.00017% International Annealed Copper Standard (% IACS).

A rotor assembly fabricator may secure the at least one permanent magnet to a radially outer surface of the electrical insulator via at least one band (704). For example, the rotor assembly fabricator may secure permanent magnets 414 to electrical insulator 416, 616 via banding 418.

The following examples may illustrate one or more aspects of the disclosure:

Example 1. A rotor assembly comprising: a rotor core having an axial length and configured to rotate about a longitudinal axis; at least one permanent magnet disposed about a radially outer surface of the rotor core; and an electrical insulator disposed between the radially outer surface of the rotor core and the at least one permanent magnet and configured to disrupt an electrical conduction path along the axial length of the rotor core.

Example 2. The rotor assembly of example 1, wherein the electrical insulator is configured to support the at least one permanent magnet at a radial position against a radially inwards pressure.

Example 3. The rotor assembly of example 1 or example 2, wherein the electrical insulator comprises at least one of an electrically insulating fiber, S-glass fiber, a thermosetting polymer, a thermoplastic, or an electrically insulating filament.

Example 4. The rotor assembly of example 3, wherein the electrical insulator comprises a winding of a plurality of filaments.

Example 5. The rotor assembly of example 4, wherein the rotor core comprises a first axial end segment and a second axial end segment, wherein the electrical insulator is mechanically connected to each of the first and second axial end segments.

Example 6. The rotor assembly of example 5, wherein the electrical insulator is mechanically connected to each of the first and second end axial segments via at least one of an adhesive, a mechanical fastener, a compression fitting, a laser beam weld, a friction weld, a frictional fit, a press fit, a trap-lock fitting, or a push-lock fitting.

Example 7. The rotor assembly of example 5 or example 6, wherein the electrical insulator is configured to transfer a torque between the first and second axial end segments.

Example 8. The rotor assembly of any one of examples 1 through 7, wherein the electrical insulator is configured to retain the at least one permanent magnet in the direction of the longitudinal axis.

Example 9. The rotor assembly of any one of examples 1 through 8, further comprising: a soft magnetic material adjacent to a radially inwards surface of at least one of the plurality of permanent magnets.

Example 10. The rotor assembly of example 9, wherein the soft magnetic material comprises a sleeve disposed between the at least one permanent magnet and the electrical insulator.

Example 11. The rotor assembly of example 10, wherein the sleeve comprises at least one of a nickel-zinc (NiZn) ferrite, molypermalloy (MPP) dispersed within a non-magnetic and electrically insulating binder or resin material, SAE 9310, or iron powder dispersed within a non-magnetic and electrically insulating binder or resin material.

Example 12. The rotor assembly of any one of examples 9 through 11, wherein the soft magnetic material is integrated with the electrical insulator.

Example 13. The rotor assembly of example 12, wherein the soft magnetic material comprises at least one of a MPP powder or an iron powder.

Example 14. The rotor assembly of any one of examples 9 through 13, wherein the soft magnetic material comprises at least one of a sleeve or is integrated with the electrical insulator, wherein the sleeve or the electrical insulator comprises a relative magnetic permeability of less than or equal to 100 and a saturation flux density of less than or equal to 0.5 Tesla.

Example 15. An electrical insulator for a rotor assembly, the electrical insulator comprising: a winding of a plurality of electrically insulating filaments, wherein the winding is in a cylindrical shape and is configured to mechanically couple to a rotor core, wherein the winding is configured to support at least one permanent magnet against a radially inwards pressure, and wherein the winding is configured to electrically insulate the at least one permanent magnet from the rotor core.

Example 16. The electrical insulator of example 15, wherein the winding is further configured to transfer a torque between a first rotor core segment and a second rotor core segment, wherein the first and second rotor core segments are not in direct contact with each other.

Example 17. The electrical insulator of example 15 or example 16, wherein the plurality of electrically insulating filaments comprise a plurality of S-glass fibers.

Example 18. The electrical insulator of any one of examples 15 through 17, further comprising a nonpermanent magnetic material.

Example 19. The electrical insulator of example 18, further comprising: a magnetic powder dispersed within at least one of a binder or a resin, wherein the binder or resin is dispersed within the winding.

Example 20. A method of making a rotor assembly, the method comprising: attaching an electrical insulator to one or more rotor core axial end segment; disposing a soft magnetic material adjacent to a radially inner surface of at least one permanent magnet; and securing the at least one permanent magnet to a radially outer surface of the electrical insulator via at least one band, wherein the electrical insulator is configured to reduce an electrical current flowing between the at least one permanent magnet and the rotor core.

Various examples have been described. These and other examples are within the scope of the following claims.

What is claimed is:

1. A rotor assembly comprising:
a rotor core having an axial length and configured to rotate about a longitudinal axis;
at least one permanent magnet disposed about a radially outer surface of the rotor core and a soft magnetic material adjacent to a radially inwards surface of the at least one permanent magnet; and
an electrical insulator disposed between the radially outer surface of the rotor core and the at least one permanent magnet and configured to disrupt an electrical conduction path along the axial length of the rotor core, wherein the electrical insulator comprises a winding of a plurality of filaments.

2. The rotor assembly of claim 1, wherein the electrical insulator is configured to support the at least one permanent magnet at a radial position against a radially inwards pressure.

3. The rotor assembly of claim 1, wherein the electrical insulator further comprises at least one of an electrically insulating fiber, S-glass fiber, a thermosetting polymer, or a thermoplastic.

4. The rotor assembly of claim 3, wherein the rotor core comprises a first axial end segment and a second axial end segment, wherein the electrical insulator is mechanically connected to each of the first and second axial end segments.

5. The rotor assembly of claim 4, wherein the electrical insulator is mechanically connected to each of the first and second end axial segments via at least one of an adhesive, a mechanical fastener, a compression fitting, a laser beam weld, a friction weld, a frictional fit, a press fit, a trap-lock fitting, or a push-lock fitting.

6. The rotor assembly of claim 4, wherein the electrical insulator is configured to transfer a torque between the first and second axial end segments.

7. The rotor assembly of claim 1, wherein the electrical insulator is configured to retain the at least one permanent magnet in the direction of the longitudinal axis.

8. The rotor assembly of claim 1, wherein the soft magnetic material comprises a sleeve disposed between the at least one permanent magnet and the electrical insulator.

9. The rotor assembly of claim 8, wherein the sleeve comprises at least one of a nickel-zinc (NiZn) ferrite, molypermalloy (MPP) dispersed within a non-magnetic and electrically insulating binder or resin material, SAE 9310, or iron powder dispersed within a non-magnetic and electrically insulating binder or resin material.

10. The rotor assembly of claim 1, wherein the soft magnetic material is integrated with the electrical insulator.

11. The rotor assembly of claim 10, wherein the soft magnetic material comprises at least one of a MPP powder or an iron powder.

12. The rotor assembly of claim 1, wherein the soft magnetic material comprises at least one of a sleeve or is integrated with the electrical insulator, wherein the sleeve or the electrical insulator comprises a relative magnetic permeability of less than or equal to 100 and a saturation flux density of less than or equal to 0.5 Tesla.

13. An electrical insulator for a rotor assembly, the electrical insulator comprising:
a winding of a plurality of electrically insulating filaments, wherein the winding is in a cylindrical shape and is configured to mechanically couple to a rotor core, wherein the winding is configured to support at least one permanent magnet against a radially inwards pressure, a soft magnetic material adjacent to a radially inwards surface of the at least one permanent magnet, and wherein the winding is configured to electrically insulate the at least one permanent magnet from the rotor core.

14. The electrical insulator of claim 13, wherein the winding is further configured to transfer a torque between a first rotor core segment and a second rotor core segment, wherein the first and second rotor core segments are not in direct contact with each other.

15. The electrical insulator of claim 13, wherein the plurality of electrically insulating filaments comprise a plurality of S-glass fibers.

16. The electrical insulator of claim 13, further comprising a nonpermanent magnetic material.

17. The electrical insulator of claim 16, further comprising:
a magnetic powder dispersed within at least one of a binder or a resin, wherein the binder or resin is dispersed within the winding.

18. A method of making a rotor assembly, the method comprising:
attaching an electrical insulator to one or more rotor core axial end segment;
disposing a soft magnetic material adjacent to a radially inner surface of at least one permanent magnet; and
securing the at least one permanent magnet to a radially outer surface of the electrical insulator via at least one band,
wherein the electrical insulator is configured to reduce an electrical current flowing between the at least one permanent magnet and the rotor core, wherein the electrical insulator comprises a winding of a plurality of filaments.

* * * * *